US009358919B2

(12) United States Patent
Higashikata et al.

(10) Patent No.: US 9,358,919 B2
(45) Date of Patent: Jun. 7, 2016

(54) PHOTODETECTION DEVICE HAVING A LIGHT PASSING PART, A LIGHT GUIDE MEMBER, AND A PHOTODETECTION ELEMENT

(71) Applicants: Tsuyoshi Higashikata, Aichi (JP); Mitsuharu Sugimoto, Aichi (JP); Takanori Kamo, Aichi (JP)

(72) Inventors: Tsuyoshi Higashikata, Aichi (JP); Mitsuharu Sugimoto, Aichi (JP); Takanori Kamo, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 65 days.

(21) Appl. No.: 14/282,982

(22) Filed: May 20, 2014

(65) Prior Publication Data

US 2014/0346333 A1    Nov. 27, 2014

(30) Foreign Application Priority Data

May 21, 2013   (JP) .................................. 2013-106997
Apr. 23, 2014  (JP) .................................. 2014-089132

(51) Int. Cl.
*G01J 1/04* (2006.01)
*B60Q 1/14* (2006.01)
*G01J 1/02* (2006.01)
*G01J 1/42* (2006.01)

(52) U.S. Cl.
CPC ............. *B60Q 1/1423* (2013.01); *G01J 1/0266* (2013.01); *G01J 1/0271* (2013.01); *G01J 1/0407* (2013.01); *G01J 1/0422* (2013.01); *G01J 1/0425* (2013.01); *G01J 1/4204* (2013.01)

(58) Field of Classification Search
CPC ...... G01J 1/0422; G01J 1/0271; G01J 1/0407; G01J 1/4204; G01J 1/0425
See application file for complete search history.

(56) References Cited

U.S. PATENT DOCUMENTS

| 4,880,974 A * | 11/1989 | Yamakawa ................ G01J 1/02 250/216 |
| 5,432,599 A | 7/1995 | Orii et al. |
| 6,441,557 B1 * | 8/2002 | Asakura ............... H05B 39/042 315/149 |
| 2011/0260034 A1 | 10/2011 | Sasaki et al. |

FOREIGN PATENT DOCUMENTS

| JP | 3218558 B2 | 10/2001 |
| JP | 3268888 B2 | 3/2002 |
| JP | 2010-276421 A | 12/2010 |
| JP | 2011-226946 A | 11/2011 |
| JP | 2012-183886 A | 9/2012 |
| JP | 2012-202683 A | 10/2012 |

\* cited by examiner

*Primary Examiner* — Tony Ko
(74) *Attorney, Agent, or Firm* — Osha Liang LLP

(57) ABSTRACT

A photodetection device has a light passing part in an upper portion, a light guiding member, and a photodetection element in a lower portion. Light passing through the light passing part is guided by the light guiding member to be detected by the photodetection element. The light guiding member has an incident curved surface provided annularly around a central axis on a side of the light passing part, and a reflective curved surface provided around the central axis inside the incident curved surface so as to be opposed to the incident curved surface. The light guiding member reflects light at the reflective curved surface to guide the light to a light receiving surface of the photodetection element, the light passing through the light passing part and entering the incident curved surface at a predetermined inclination angle.

7 Claims, 18 Drawing Sheets

FIG. 8C-A
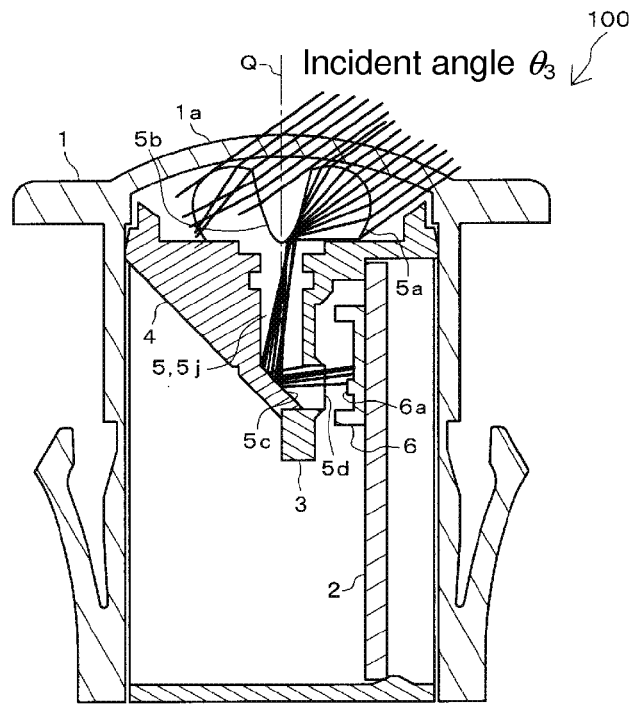
FIG. 8C-B
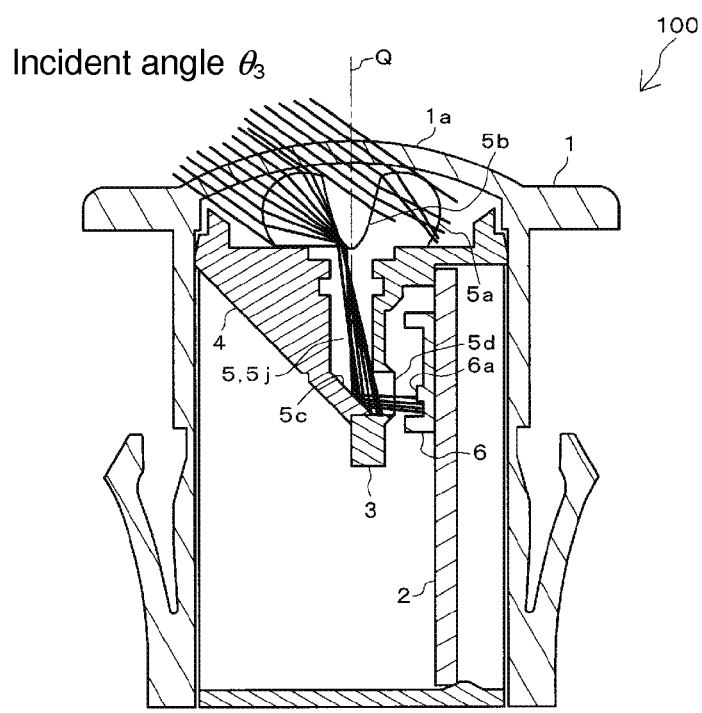

FIG. 14C-A
Incident angle 55°
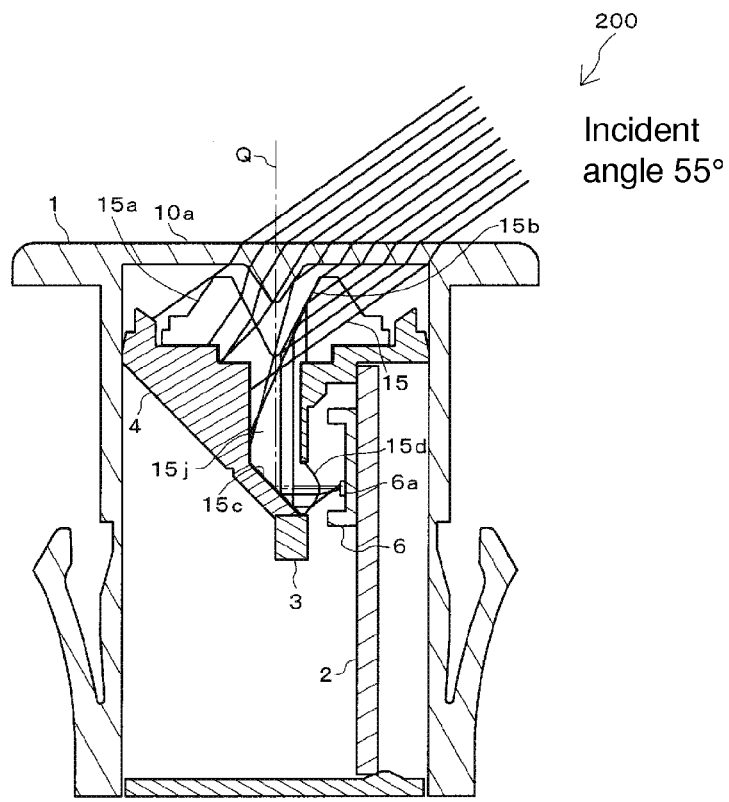
FIG. 14C-B
Incident angle 55°
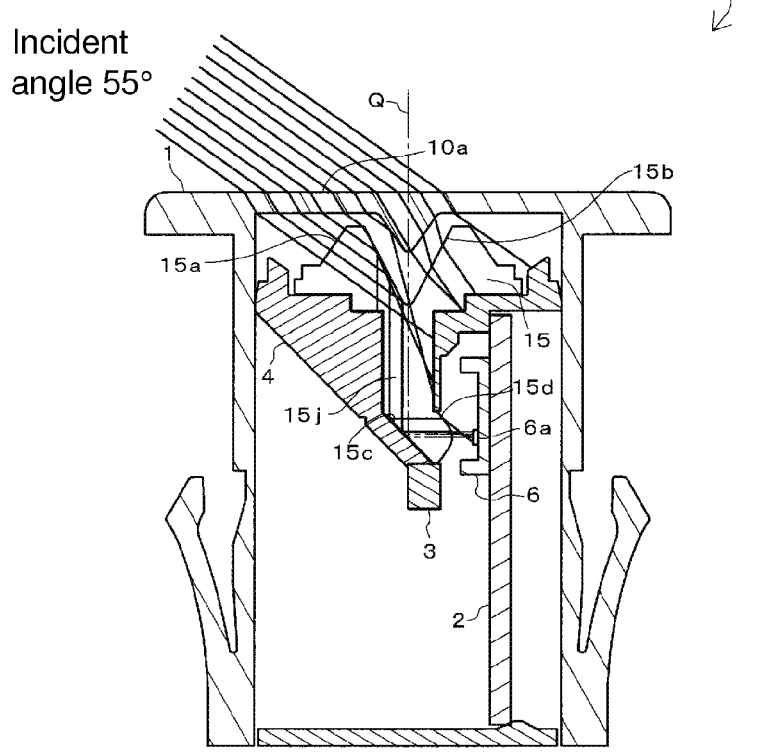

PHOTODETECTION DEVICE HAVING A LIGHT PASSING PART, A LIGHT GUIDE MEMBER, AND A PHOTODETECTION ELEMENT

BACKGROUND

1. Technical Field

The present invention relates to a photodetection device including a light guiding member for guiding incident light to a photodetection element.

2. Related Art

Conventionally, there has been known a photodetection device provided in a vehicle in order to automatically control lamps and an air conditioner of the vehicle. This photodetection device detects illuminance of light and solar radiation entering a vehicle interior by a photodetection element to control the lamps and the air conditioner, based on the detection result, as disclosed in, for example, Japanese Unexamined Patent Publications Nos. 2011-226946, 2012-183886 and 2010-276421, and Japanese Patent Nos. 3268888 and 3218558.

As a specific structure of the photodetection device, a light passing part that passes the light is provided on a light source side of the photodetection element. For example, the light passing part is made of an optical element such as a lens, a prism and the like in JP 2011-226946 A, JP 3268888 B1 and JP 3218558 B1, and the light passing part is made of an opening portion of a housing or the like in JP 2012-183886 A and JP 2010-276421 A. In JP 2011-226946 A, the photodetection element is arranged immediately under the light passing part (lens) to detect light passing the light passing part by the photodetection element.

For example, in order to control an air conditioner to properly set a temperature in a vehicle interior, not only brightness around a vehicle needs to be detected but also light directly shining on a user on a vehicle needs to be detected. Thus, an amount of light (an infrared amount and the like) from a predetermined oblique direction to the vehicle interior needs to be detected. Moreover, in order to control lamps of the vehicle, when the brightness around the vehicle is detected as well, the light from the predetermined oblique direction to the vehicle needs to be detected to perform the control more matching brightness that a driver feels.

Consequently, in JP 2012-183886 A, a light guide made of transparent or colored resin or glass is provided between the light passing part (a notch portion and a cutout portion) and the photodetection element. Front light passing through the notch portion is transmitted through a first light guide to be guided to a first photodetection element. Moreover, after upper light passing through the notch portion is caused to enter from an incident surface of the first light guide, the upper light is totally reflected at a boundary surface to change an optical path, and is guided to the first photodetection element. Furthermore, ambient light passing through the cutout portion is condensed at a condensing lens part provided in a second light guide to be guided to a second photodetection element.

In JP 2010-276421 A, a prism in which an incident surface is divided into three inclined surfaces is provided between the light passing part (opening portion) and three photodetection elements. Front light of light passing through the light passing part is guided to the first photodetection element by the first inclined surface, upper left light is guided to the second photodetection element by the second inclined surface, and upper right light is guided to the third photodetection element by the third inclined surface.

In JP 3268888 B1, a surface on the light source side of the optical element constituting the light passing part is convex, and a surface on a photodetection element side is an assemblage of prism surfaces. A center of these prism surfaces has a spindle shape opened on the photodetection element side with a point on an optical axis of the optical element as an origin. This brings about predetermined output characteristics with respect to incident angles in a gamut from a vertical direction to a horizontal direction.

In JP 3218558 B1, a conical lens part, a concave lens part, and a convex lens part are provided in a surface on the photodetection element side of the lens constituting the light passing part. The conical lens part shields light from direct above and transmits oblique light. Moreover, the concave lens part guides oblique to horizontal light to the photodetection element, and the convex lens part guides oblique light in a predetermined range to the photodetection element.

In JP 2012-202683 A, there has been disclosed a technique of pasting a transmission attenuation sheet on a portion of a lens to thereby make a light transmission amount of the relevant portion different from that of the other portion.

SUMMARY

As in JP 2012-183886 A and JP 2010-276421 A, the use of the light guiding member (the light guide or the prism) can increase a freedom degree of arrangement of the photodetection element with respect to the light passing part. However, in JP 2012-183886 A and JP 2010-276421, light that the one photodetection element can detect is limited to the light entering from one specific direction. This needs to increase the photodetection elements in number in order to detect ambient light entering at a predetermined inclination angle from all directions for the purpose of accurately performing the control of lamps or an air conditioner of a vehicle. However, the increase of the photodetection elements in number leads to an increase of the photodetection device in size, which runs counter to demand for downsizing.

One or more embodiments of the present invention provides a photodetection device capable of detecting ambient light entering at a predetermined angle from all directions while realizing downsizing.

In accordance with one or more embodiments of the present invention, in a photodetection device in which light passing through a light passing part in an upper portion is guided by a light guiding member to be detected by a photodetection element in a lower portion, the light guiding member has an incident curved surface provided annularly around a central axis on a side of the light passing part, and a reflective curved surface provided around the central axis inside the incident curved surface so as to be opposed to the incident curved surface, and the light guiding member reflects light at the reflective curved surface to guide the light to a light receiving surface of the photodetection element, the light passing through the light passing part and entering the incident curved surface at a predetermined inclination angle. The "upper" refers to an upward direction in a vertical direction, and the "lower" refers to a downward direction in the vertical direction (the same applies hereinafter).

In this manner, the annular incident curved surface and the reflective curved surface are provided around the central axis of the light guiding member, by which ambient light entering the photodetection device at the predetermined inclination angle from all directions is guided by the light guiding member to be detected by the photodetection element. As a result, since a number of photodetection elements need not be provided, downsizing of the photodetection device can be realized.

In one or more embodiments of the present invention, in the above-described photodetection device, the light guiding member may have a shaft part extending in a direction of the central axis, and an annular head part provided above the shaft part so as to surround the central axis, and the incident curved surface may be formed on an outer side of the head part, the reflective curved surface may be formed on an inner side of the head part, and an outgoing surface that emits the light to the photodetection element may be formed at a forefront of the shaft part.

Moreover, in one or more embodiments of the present invention, in the above-described photodetection device, the incident curved surface of the annular head part may have a shape including a curved portion projected outward in a cutting plane when the light guiding member is cut along the plane including the central axis. Alternatively, the incident curved surface of the annular head part may have a shape including a linear portion in a cutting plane when the light guiding member is cut along the plane including the central axis.

Moreover, in one or more embodiments of the present invention, in the above-described photodetection device, the outgoing surface may be formed into a convex lens.

Moreover, in one or more embodiments of the present invention, in the above-described photodetection device, in a portion of an inner surface of the light passing part opposed to the reflective curved surface, a projected part projected on a side of the light guiding member may be provided.

In one or more embodiments of the present invention, the above-described photodetection device may include a substrate on which electronic components including the photodetection element are mounted, and the photodetection element may have the light receiving surface that receives the light, the light receiving surface may be arranged in parallel to the central axis, and the light guiding member may further have a reflective surface that reflects light to the photodetection element, the light entering the incident curved surface at the predetermined inclination angle and reflected at the reflective curved surface.

In one or more embodiments of the present invention, in the above-described photodetection device, illuminance of ambient light of a vehicle may be detected by the photodetection element so that lamps of the vehicle may be controlled, based on the detection result.

According to one or more embodiments of the present invention, there can be provided a photodetection device capable of detecting ambient light entering at a predetermined angle from all directions while realizing downsizing.

BRIEF DESCRIPTION OF THE DRAWINGS

FIGS. 8C-A and 8C-B are cross-sectional views showing shining states of ambient light to the photodetection device in FIGS. 1A and 1B.

FIGS. 14C-A and 14C-B are cross-sectional views showing shining states of ambient light to the photodetection device in FIG. 12.

DETAILED DESCRIPTION

Figure 1A:
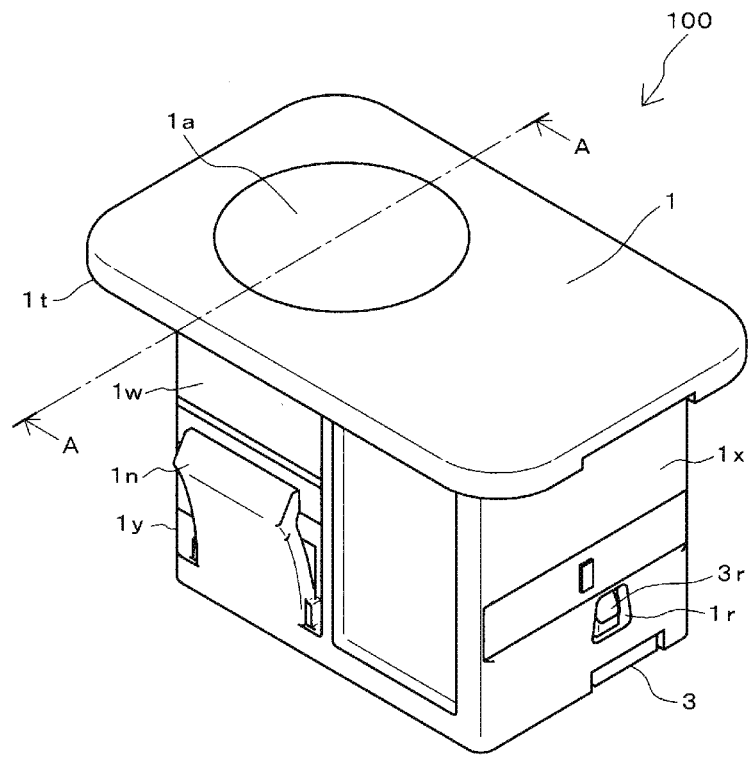
FIGS. 1A and 1B are perspective views of a photodetection device according to one or more embodiments of the present invention.

Hereinafter, embodiments of the present invention will be described with reference to the drawings. In the respective drawings, the like reference numerals are given to the like parts or corresponding parts. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First, a structure of a photodetection device 100 according to one or more embodiments of the present invention will be described with reference to FIGS. 1A to 7B.

Figure 1B:
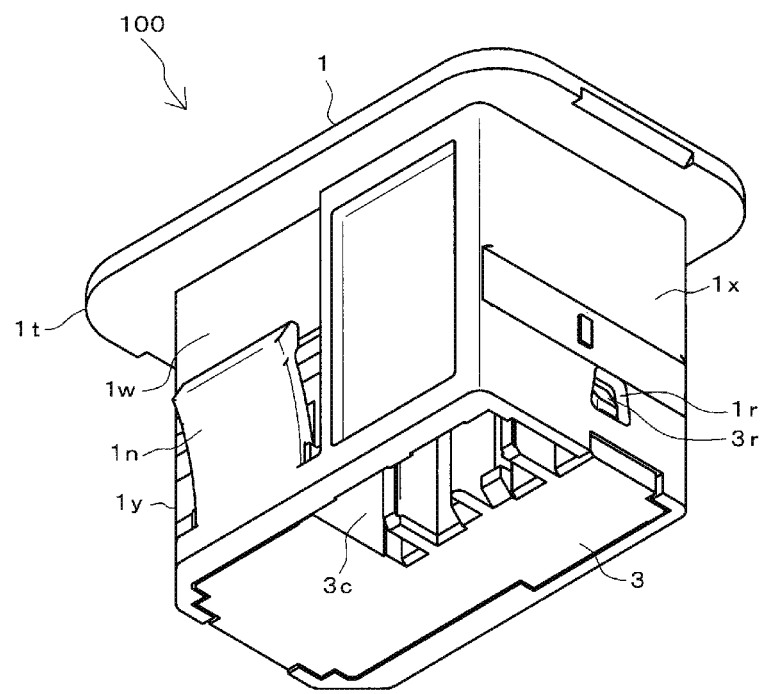

The photodetection device 100 is an auto light sensor for automatically controlling lighting/lighting-out of headlights and tail lights of an automatic four-wheeled vehicle. FIG. 1A shows a perspective view in which the photodetection device 100 is viewed from above, and FIG. 1B shows a perspective view when the photodetection device 100 is viewed from underneath.

Figure 2:
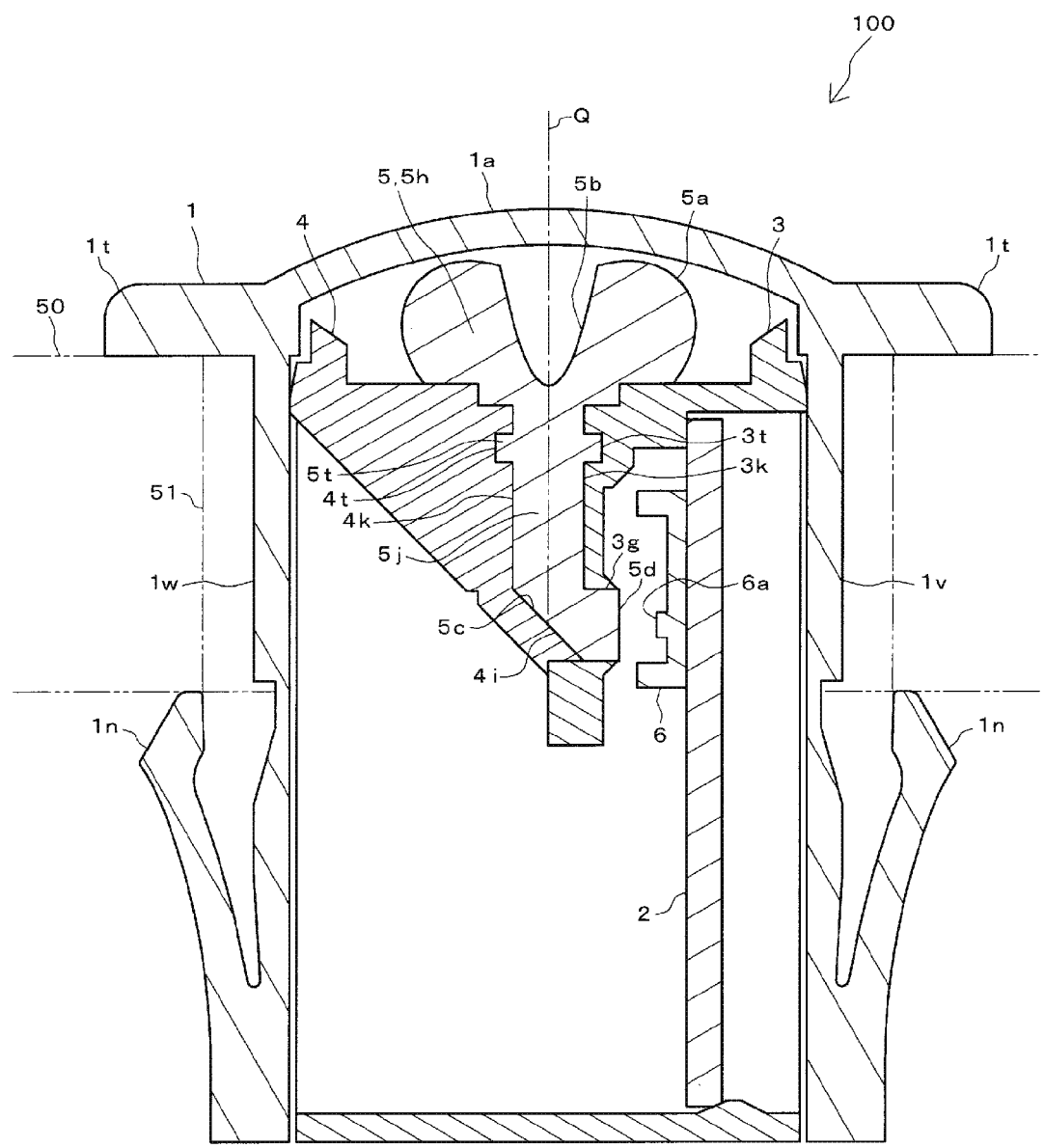
FIG. 2 is a cross-sectional view of the photodetection device in FIGS. 1A and 1B.
Figure 3:
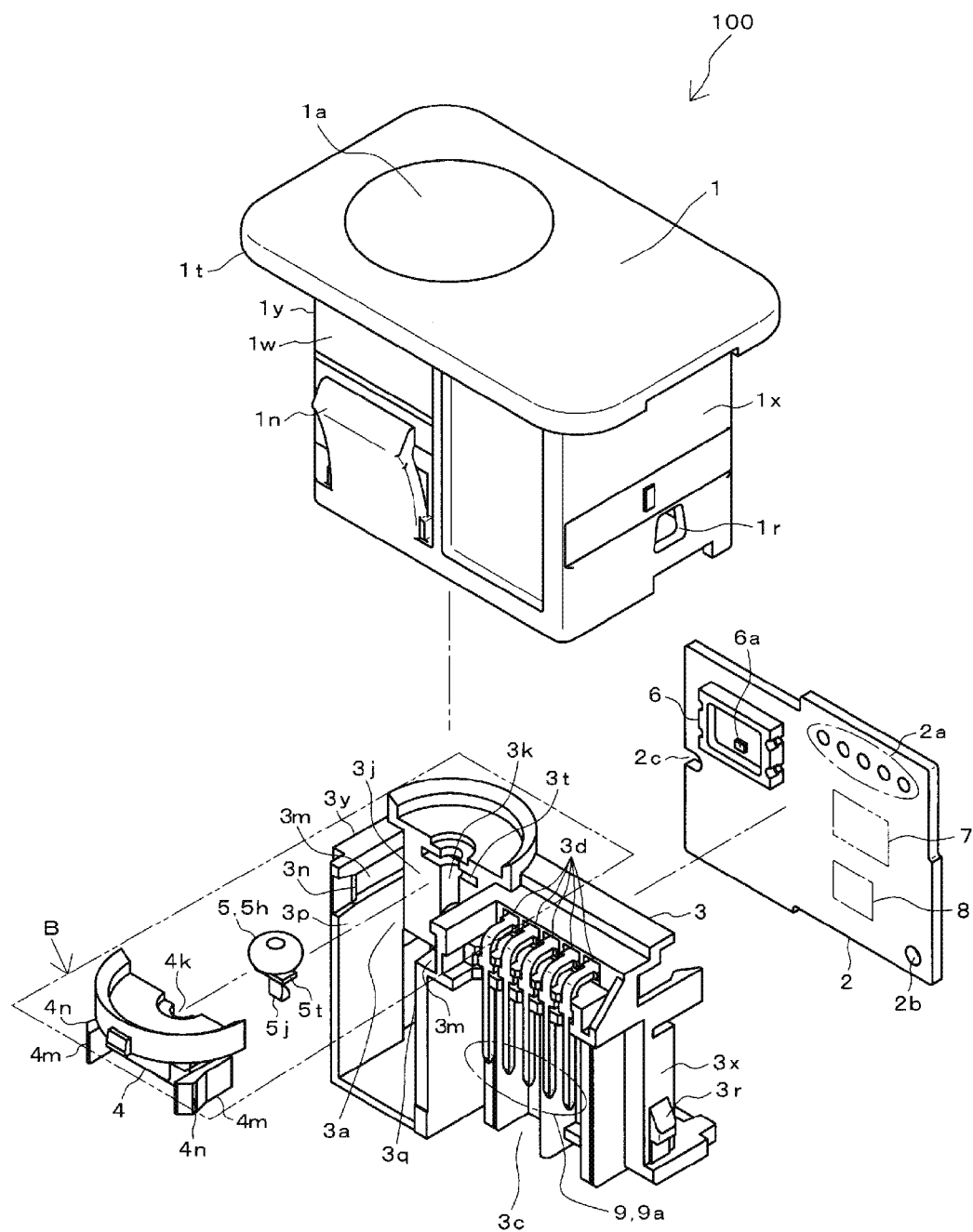
FIG. 3 is an exploded view of the photodetection device in FIGS. 1A and 1B.

As shown in FIGS. 2 and 3, the photodetection device 100 includes a housing 1, a substrate 2, a holding member 3, an attachment member 4, and a light guiding member 5. FIG. 2 is a cross-sectional view along A-A of the photodetection device 100 in FIGS. 1A-1B. FIG. 3 is an exploded view of the photodetection device 100.

The housing 1 is made of a synthetic resin molded article. The housing 1 is formed into a box shape opened on a lower side. A flange part 1*t* is formed in an upper portion of the housing 1. As shown in FIG. 2, in each of both side surfaces 1*v*, 1*w* in a short direction of the housing 1, a claw part 1*n* is formed. As shown in FIG. 3, in one side surface 1*x* in a longitudinal direction of the housing 1, a lock hole 1*r* is formed. Similarly, in a side surface 1*y* of the housing 1 on the opposite side, a rock hole is also formed (illustration is omitted).

In an upper surface of the housing 1, an upward convex lens 1*a* is provided. The lens 1*a* transmits, for example, an infrared component and a visible light component of incident light. Ambient light of the photodetection device 100 passes through the lens 1*a* and enters the housing 1. The lens 1*a* is one example of a "light passing part" according to one or more embodiments of the present invention.

The substrate 2, the holding member 3, the attachment member 4, and the light guiding member 5 are housed in the housing 1, as shown in FIG. 2.

The substrate 2 is made of a printed wiring board. Electronic components such as a photodetection element 6, a microcomputer 7 and the like are mounted on the substrate 2, and electric circuits such as a communication circuit 8 and the like are formed, as shown in FIG. 3. Moreover, in the substrate 2, a plurality of connection holes 2*a*, a boss hole 2*b*, and a key groove 2*c* are formed.

Figure 4A:
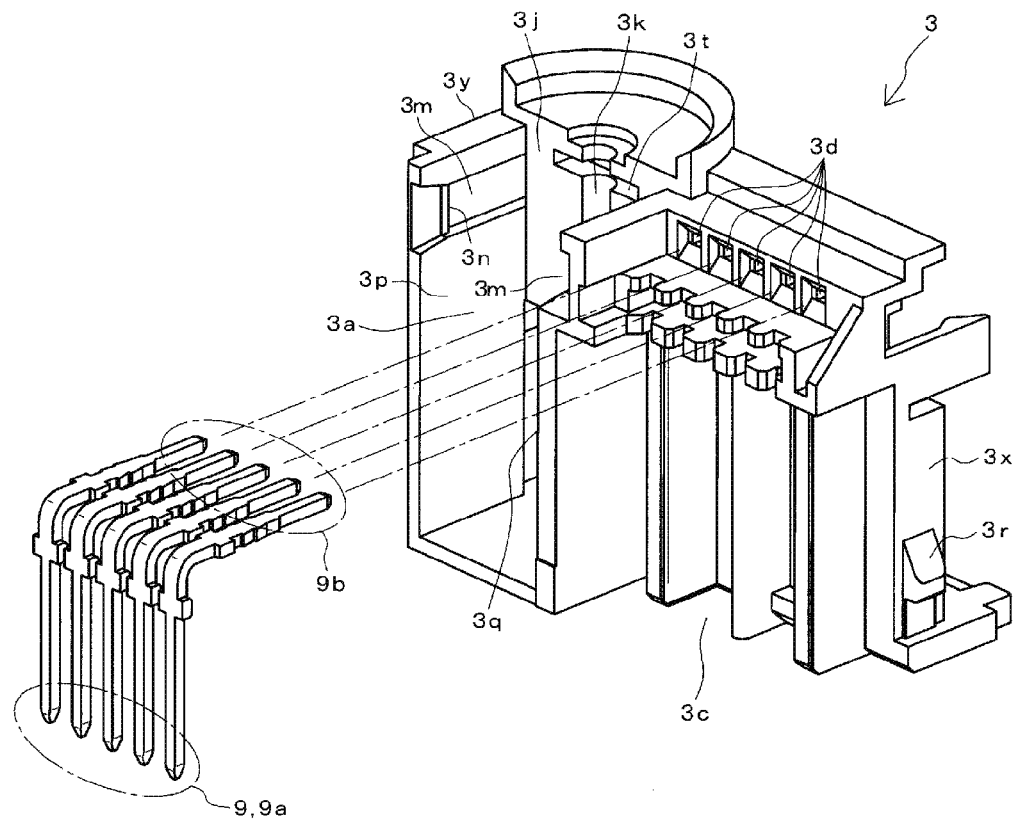
FIGS. 4A and 4B are perspective views of a holding member included in the photodetection device in FIGS. 1A and 1B.
Figure 4B:
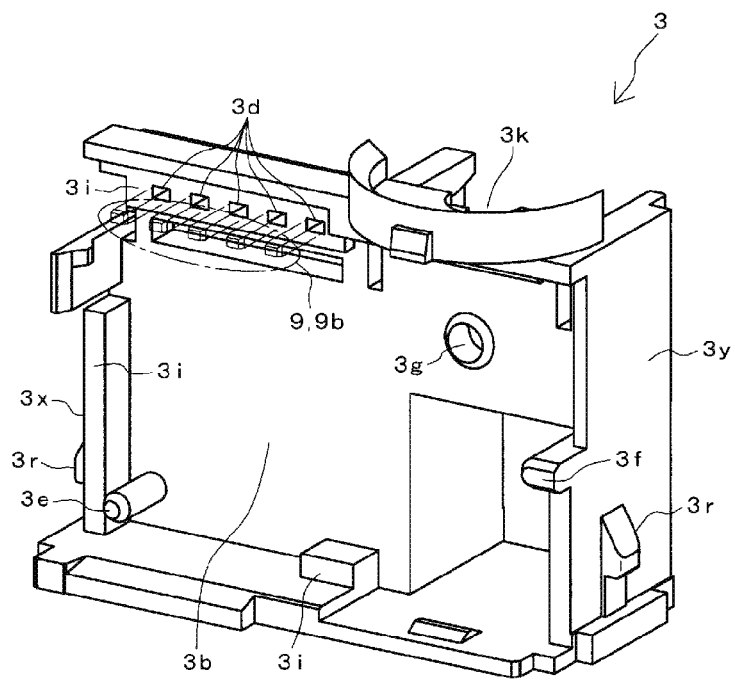

FIGS. 4A and 4B are perspective views of the holding member 3, FIG. 4A showing a state viewed from a left side in FIG. 3. and FIG. 4B showing a state viewed from a right side. The holding member 3 is made of a synthetic resin molded article. In each of both side surfaces 3*x*, 3*y* in a longitudinal direction of the holding member 3, a lock projection 3*r* is formed.

On one side in a short direction of the holding member 3, a first holding part 3*a* and a connector part 3*c* are formed as shown in FIG. 4A, and on another side, a second holding part 3*b* is formed, as shown in FIG. 4B.

As shown in FIG. 4A, a plurality of through-holes 3*d* are formed above the connector part 3*c*. A plurality of L-shaped pin terminals 9 are pressed into the respective through-holes 3*d*, by which the respective pin terminals 9 are attached to the connector part 3*c*, as shown in FIG. 3. One end 9*a* of each of the pin terminals 9 is projected downward in the connector part 3*c*.

Another end 9*b* of each of the pin terminals 9 is projected to the second holding part 3*b*, as shown in FIG. 4B. In the second holding part 3*b*, a boss 3*e*, a key projection 3*f*, and a light guiding hole 3*g* are formed.

As shown in FIGS. 3 and 4A, in a back wall 3*j* of the first holding part 3*a*, an engagement groove 3*k* for engaging the light guiding member 5 is formed. In an upper portion of the engagement groove 3*k*, a wider part 3*t* resulting from expanding the groove 3*k* in a width direction is provided. A lower portion of the engagement groove 3*k* communicates with the light guiding hole 3*g*.

In each of opposed side walls 3*p*, 3*q* of the first holding part 3*a*, a holding groove 3*m* for holding the attachment member 4 is formed in a horizontal direction. In each of the holding grooves 3*m*, a step part 3*n* is formed, as shown in FIGS. 7A and 7B.

Figure 7A:
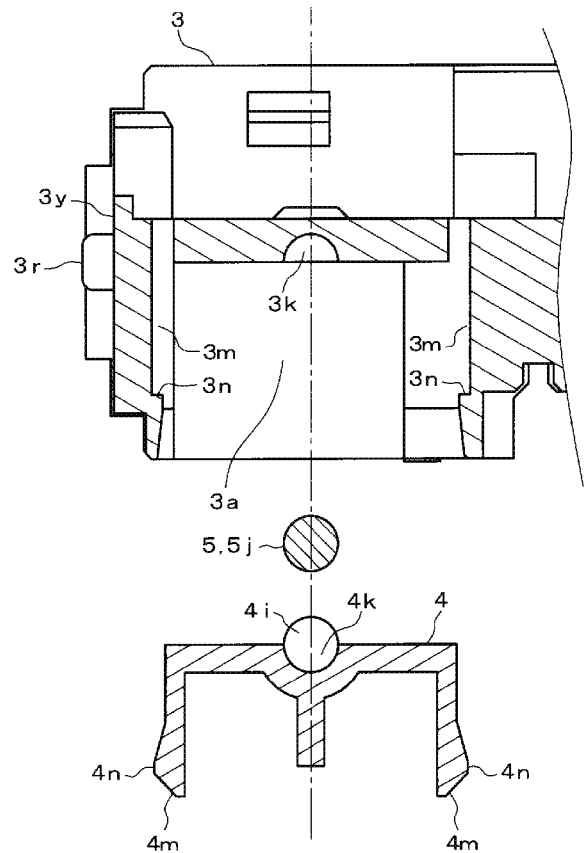
FIGS. 7A and 7B are cross-sectional views showing an engagement state of the holding member in FIG. 4 and the attachment member in FIGS. 5A and 5B.
Figure 7B:
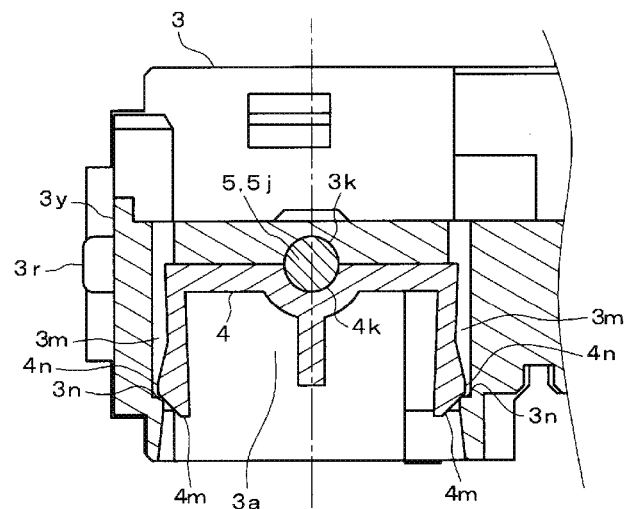

FIGS. 7A and 7B are views showing an engagement state between the holding member 3 and the attachment member 4, each showing a cross section resulting from cutting the members 3 to 5 along a plane B in FIG. 3, and viewed from above.

Figure 5A:
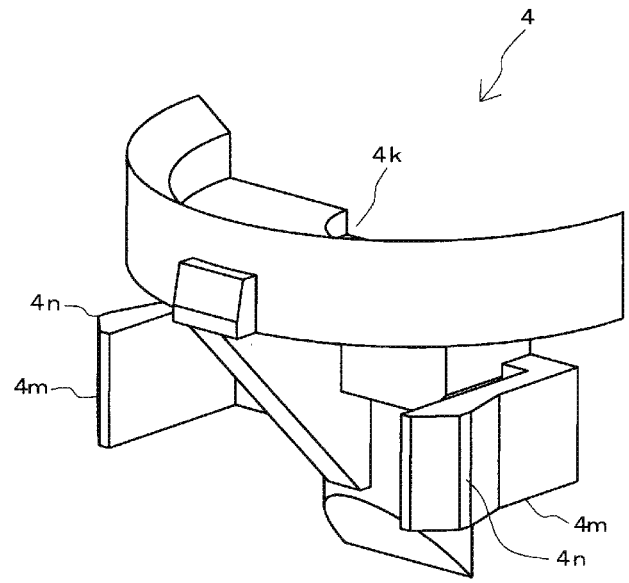
FIGS. 5A and 5B are perspective views of an attachment member included in the photodetection device in FIGS. 1A and 1B.
Figure 5B:
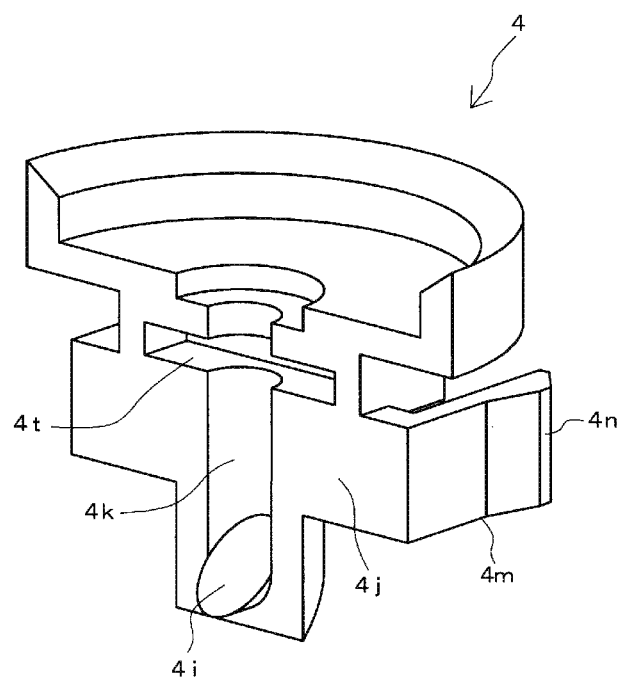

FIGS. 5A and 5B perspective views of the attachment member 4, 5A showing a state viewed from the left side in FIGS. 3, and 5B showing a state viewed from the right side. The attachment member 4 is made of a synthetic resin molded article. The attachment member 4 is provided with a pair of arms 4*m*. At a forefront portion of each of the arms 4*m*, a lock part 4*n* expanding outward in a trapezoid shape is provided, as shown in FIGS. 5A and 5B and FIGS. 7A and 7B.

As shown in FIG. 5B, in a side surface 4*j* of the attachment member 4, an engagement groove 4*k* for engaging the light guiding member 5 is formed. In an upper portion of the engagement groove 4*k*, a wider part 4*t* resulting from expanding the groove 4*k* in a width direction is provided. In a lower portion of the engagement groove 4*k*, an inclined surface 4*i* is provided.

Figure 6A:
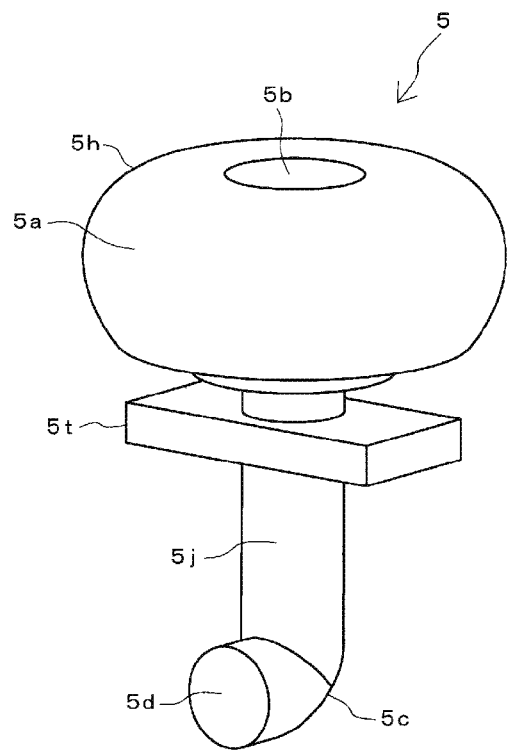
FIGS. 6A and 6B are a perspective view and a cross-sectional view of a light guiding member included in the photodetection device in FIGS. 1A and 1B.
Figure 6B:
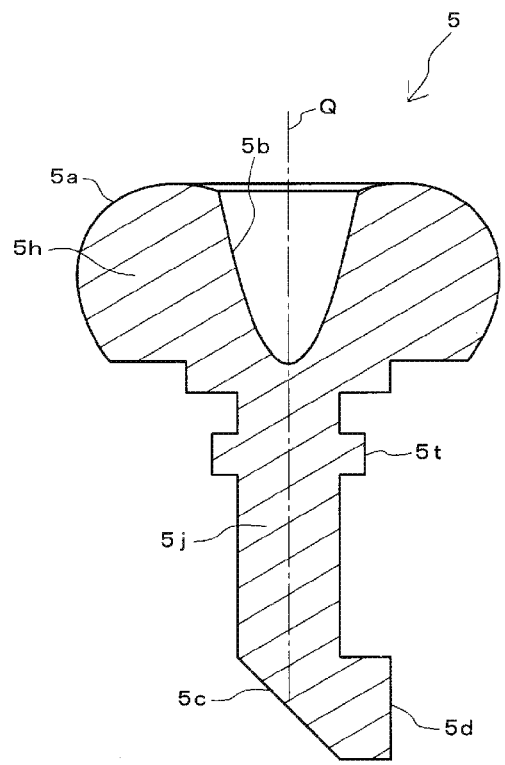

FIGS. 6A and 6B are views showing the light guiding member 5, 6A showing a perspective view, and 6B showing a cross-sectional view. The light guiding member 5 is formed of a transparent synthetic resin. The light guiding member 5 has a shaft part 5*j* extending in a direction of a central axis Q, an annular head part 5*h* provided above this shaft part 5*j* so as to surround the central axis Q, and a flange part 5*t* provided under this head part 5*h*.

The head part 5*h* is formed into a substantial toroidal shape, and has an outer diameter larger than the shaft part 5*j*. An incident curved surface 5*a* is formed on an outer side of the head part 5*h*. A funnel-shaped reflective curved surface 5*b* is formed on an inner side of the head part 5*h*. Thereby, the incident curved surface 5*a* is provided annularly around the central axis Q, and the reflective curved surface 5*b* is provided around the central axis Q inside the incident curved surface 5*a* so as to be opposed to the incident curved surface 5*a*.

Particularly, as shown in FIGS. 2 and 6B, when the light guiding member 5 is cut along a plane including the central axis Q, the incident curved surface 5*a* of the annular head part 5*h* has a shape including a curved portion projected outward in the cutting plane. While in this case, the whole portion projected outward is the curved portion, a linear portion may be partially included (in an end portion or the like). Moreover, when the light guiding member 5 is cut along the plane including the central axis Q, the reflective curved surface 5*b* of the annular head part 5*h* has a shape including a curved portion depressed inward in the cutting plane. In this case as well, the whole portion depressed inward may be the curved portion, or a linear portion may be partially included.

The shaft part 5*j* is formed into a columnar shape, and has a lower end portion bent at a right angle toward one side direction. On an outer side of the bent portion of this shaft part 5*j*, a reflective surface 5*c* is provided so as to be inclined at a predetermined angle with respect to the central axis Q. Moreover, at a forefront of the shaft part 5*j*, an outgoing surface 5*d* directed to the one side direction in parallel to the central axis Q is provided. The flange part 5*t* is formed into a rectangular parallelepiped.

Next, an assembling method of the photodetection device 100 will be described.

In FIG. 3, first, the substrate 2 is brought closer to the holding member 3 in a state where the photodetection element 6 is opposed to the second holding part 3*b* (FIG. 4B) of the holding member 3, and the ends 9*b* (FIG. 4B) of the respective pin terminals 9 are passed through the connection holes 2*a* of the substrate 2. Moreover, the boss 3*e* (FIG. 4B) of the holding member 3 is fitted into the boss hole 2*b* of the substrate 2, and the key projection 3*f* (FIG. 4B) of the holding member 3 is fitted into the key groove 2*c* of the substrate 2.

The ends 9b of the respective pin terminals 9 are soldered to the substrate 2 in a state where the substrate 2 is in contact with a contact surface 3i (FIG. 4B) of the second holding part 3b.

This brings a state where the substrate 2 is held by the second holding part 3b in a vertical direction, as shown in FIG. 2. A light receiving surface 6a of the photodetection element 6 mounted on the substrate 2 is brought into a state opposed to the light guiding hole 3g (FIG. 4B) of the holding member 3.

Next, the shaft part 5j and the flange part 5t of the light guiding member 5 are inserted into the engagement groove 3k and the wider part 3t in the first holding part 3a of the holding member 3, which are shown in FIG. 3 and the like. Moreover, a vicinity portion of the outgoing surface 5d of the light guiding member 5 is inserted into the light guiding hole 3g of the holding member 3.

This allows half of the light guiding member 5 (a right half in FIG. 2) to be engaged with the engagement groove 3k, so that the light guiding member 5 is brought into a state temporarily held by the first holding part 3a. Moreover, the outgoing surface 5d of the light guiding member 5 is brought into a state exposed from the light guiding hole 3g and opposed to the light receiving surface 6a of the photodetection element 6.

Next, the respective arms 4m of the attachment member 4 are inserted into the respective holding grooves 3m in the first holding part 3a of the holding member 3, so that the lock parts 4n of the respective arms 4m are engaged with the step parts 3n of the respective holding grooves 3m, as shown in FIG. 7B.

This brings a state where the attachment member 4 is held by the first holding part 3a, as shown in FIG. 2. Moreover, the shaft part 5j, the flange part 5t and the reflective surface 5c of the light guiding member 5 are engaged with the engagement groove 4k, the wider part 4t, and the inclined surface 4i of the attachment member 4, respectively, which brings a state where the light guiding member 5 is sandwiched between the attachment member 4 and the holding member 3. Moreover, the head part 5h of the light guiding member 5 is projected from upper portions of the holding member 3 and the attachment member 4, and the incident curved surface 5a and the reflective curved surface 5b are arranged on the lens 1a side.

Next, the holding member 3 is inserted into an inside of the housing 1 from a lower side, and the lock projections 3r of the holding member 3 are engaged with the rock holes 1r of the housing 1, as shown in FIGS. 1A and 1B.

This allows the holding member 3 to be fixed to the housing 1, and brings a state where the substrate 2, the holding member 3, the attachment member 4 and the light guiding member 5 are housed in the housing 1, as shown in FIG. 2. That is, it is a state where the photodetection device 100 has been assembled.

In the photodetection device 100 assembled as described above, the light guiding member 5 is located immediately under the lens 1a, and the central axes Q of the light guiding member 5 and the lens 1a matches each other. Moreover, the substrate 2 and the light receiving surface 6a of the photodetection element 6 are arranged in parallel to the central axis Q. The central axis Q is also an optical axis of the light guiding member 5 and the lens 1a.

Moreover, at a lower end of the photodetection device 100, the connector part 3c is open, as shown in FIG. 1B. In the connector part 3c, a connector provided at one end of a harness not shown is fitted. Another end of the harness is connected to a vehicle control device not shown.

This allows the vehicle control device and the microcomputer 7 on the substrate 2 to be electrically connected through the harness, the pin terminals 9 of the connector part 3c, the substrate 2 and the like, which enables communication by the communication circuit 8 and the like.

The photodetection device 100 is inserted into an attachment hole 51 provided in a dashboard 50 of the automatic four-wheeled vehicle, as shown in FIG. 2. The flange part 1t and the claw parts 1n of the housing 1 are engaged with upper and lower edges of the attachment hole 51, by which the photodetection device 100 is attached to the dashboard 50.

Next, shining states of the ambient light to the photodetection device 100 will be described with reference to FIGS. 8A to 8D.

For example, since a light source such as the sun and the like moves and the vehicle provided with the photodetection device 100 also moves, an incident angle of the ambient light entering an vehicle interior from an vehicle exterior changes. Light having incident angles $\theta_1$ to $\theta_4$ as indicated by bold lines in FIGS. 8A to 8D passes through the lens 1a from an upper side of the photodetection device 100 and enters the inside from the incident curved surface 5a and the reflective curved surface 5b of the light guiding member 5.

In the present example, the incident angles $\theta_1$ to $\theta_4$ represent inclination angles with respect to the central axis Q, and increase in order of $\theta_1$, $\theta_2$, $\theta_3$, and $\theta_4$ ($\theta_1 < \theta_2 < \theta_3 < \theta_4$). Moreover, the light having the incident angles $\theta_1$ to $\theta_4$ is light not parallel to the central axis Q ($\theta_1, \theta_2, \theta_3, \theta_4 > 0°$). Moreover, the light having the incident angle $\theta_3$ is ambient light affecting lighting/lighting-out control of the lamps of the vehicle (the headlights, the tail lights) (e.g., $\theta_3 = 30°$ to $70°$). The lights having the other incident angles $\theta_1$, $\theta_2$, $\theta_4$ are examples of ambient light hardly affecting the lighting/lighting-out control of the lamps of the vehicle.

As indicated by bold lines in FIG. 8A, the light entering the incident curved surface 5a of the light guiding member 5 at the incident angle $\theta_1$ is bent at the incident curved surface 5a, and then hits the holding member 3 and the attachment member 4, so that it is not guided to the photodetection element 6 below. Moreover, part of the light entering the reflective curved surface 5b of the light guiding member 5 at the incident angle $\theta_1$ is reflected at the reflective surface 5c after being bent at the reflective curved surface 5b, and is emitted from the outgoing surface 5d to the photodetection element 6. However, the light is not received by the light receiving surface 6a of the photodetection element 6.

Moreover, as indicated by bold lines in FIGS. 8B and 8D, the light entering the incident curved surface 5a of the light guiding member 5 at the incident angles $\theta_2$, $\theta_4$ is reflected at the reflective curved surface 5b after being bent at the incident curved surface 5a, and hits the holding member 3, so that the light is not guided to the photodetection element 6 below. The light entering the reflective curved surface 5b of the light guiding member 5 at the incident angles $\theta_2$, $\theta_4$ is bent at the reflective curved surface 5b, so that the light is not guided to the photodetection element 6 below.

Figure 8A:
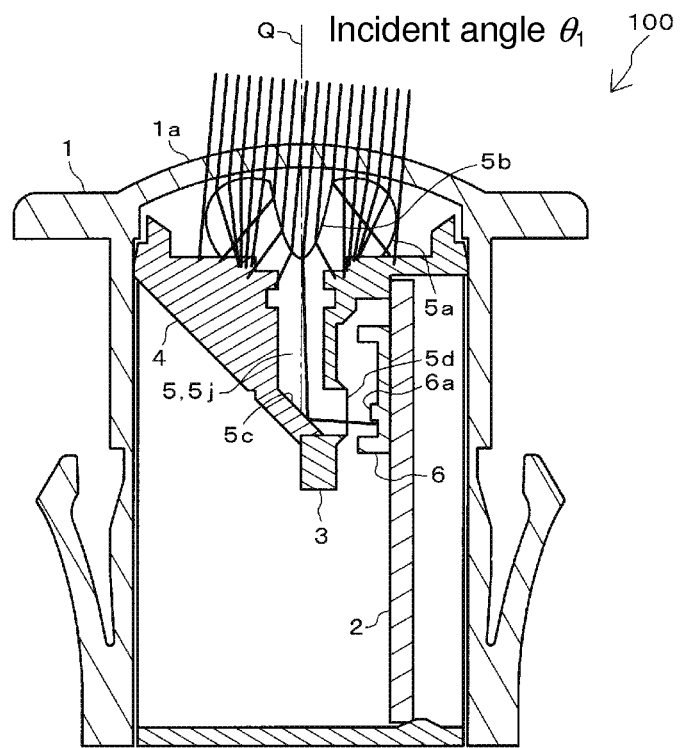
FIG. 8A is a cross-sectional view showing a shining state of ambient light to the photodetection device in FIGS. 1A and 1B.
Figure 8B:
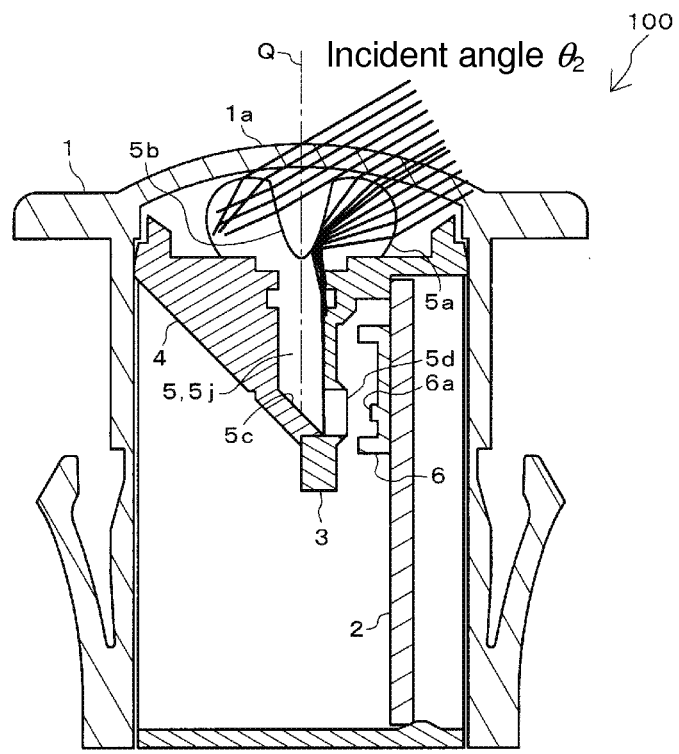
FIG. 8B is a cross-sectional view showing a shining state of ambient light to the photodetection device in FIGS. 1A and 1B.
Figure 8D:
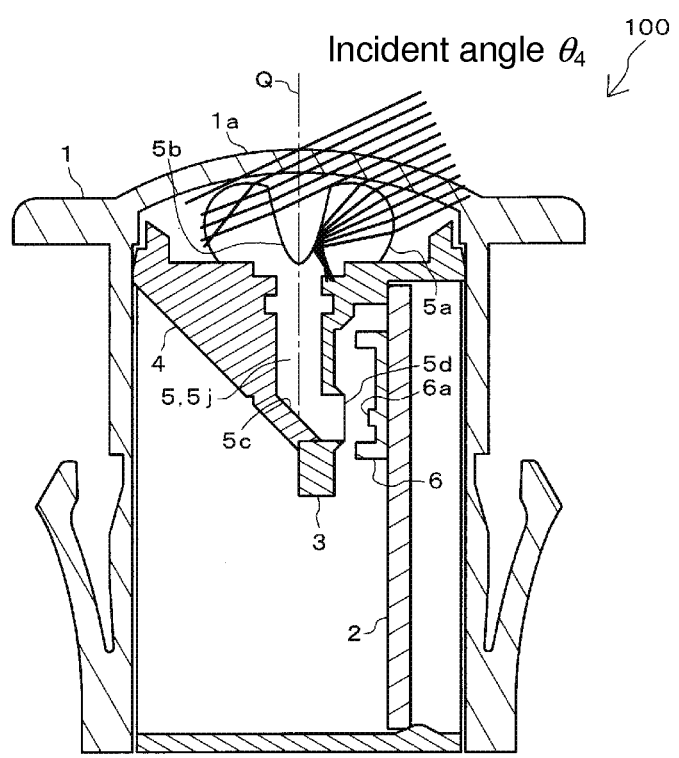
FIG. 8D is a cross-sectional view showing a shining state of ambient light to the photodetection device in FIGS. 1A and 1B.

Furthermore, similarly, the light entering the incident curved surface 5a and the reflective curved surface 5b of the light guiding member 5 at the incident angles $\theta_1$, $\theta_2$, $\theta_4$ from all other directions different from those of the light indicated by the bold lines in FIGS. 8A, 8B and 8D is not guided to the photodetection element 6, either.

On the other hand, as indicated by bold lines in FIG. 8CA, the light entering the incident curved surface 5a of the light guiding member 5 at the incident angle $\theta_3$ is reflected at the reflective curved surface 5b after being bent at the incident curved surface 5a, and advances downward inside the shaft part 5j. This light is reflected at the reflective surface 5c, and is emitted from the outgoing surface 5d to the photodetection element 6 to be received by the light receiving surface 6a of the photodetection element 6.

Moreover, the light entering the incident curved surface 5a of the light guiding member 5 at the incident angle $\theta_3$ from all the directions different from those of the light indicated by the bold lines in FIG. 8CA is also reflected at the reflective curved surface 5b after being bent at the incident curved surface 5a, and advances downward inside the shaft part 5j, for example, as indicated by bold lines in FIG. 8CB. This light is reflected at the reflective surface 5c, and is emitted from the outgoing surface 5d to be received by the light receiving surface 6a of the photodetection element 6.

In this manner, the photodetection device 100 can detect the light in the vicinity of the desired incident angle (in the above-described example, $\theta_3$) from the incident ambient light.

The light entering the reflective curved surface 5b of the light guiding member 5 at the incident angle $\theta_3$ is bent at the reflective curved surface 5b, and is not guided to the photodetection element 6 below.

The incident curved surface 5a and the reflective curved surface 5b of the light guiding member 5, which guide the light entering at the incident angle $\theta_3$ to the light receiving surface 6a of the photodetection element 6 as described above, can be designed in the following procedure.

First, a point X (not shown) is found by drawing an arbitrary straight line (corresponding to light) from the light receiving surface 6a of the photodetection element 6 to the reflective surface 5c of the light guiding member 5, and reflecting the straight line at the reflective surface 5c to hit the reflective curved surface 5b which is temporarily set. Next, a curvature of the reflective curved surface 5b at the point X is temporarily set as A. The above-described straight line that hits the point X is reflected at the reflective curved surface 5b in accordance with the curvature A, and passes through an inside of the head part 5h to hit the temporarily set incident curved surface 5a. A point where the straight line hits the incident curved surface 5a is defined as Y (not shown), and a curvature of the incident curved surface 5a is temporarily set as B.

The light emitting from the point Y into the air is refracted at an angle determined from a relative refractive index between the light guiding member 5 and the air, and the curvature B of the incident curved surface 5a. The relative refractive index between the light guiding member 5 and the air is determined by a material of the light guiding member 5. Next, the curvature B allowing the angle of the light emitting from the point Y into the air to match the inclination angle $\theta_3$ with respect to the central axis Q is found. The above-described series of work is repeatedly performed while minutely changing an angle of the straight line drawn from the light receiving surface 6a to the reflective surface 5c, by which shapes of the incident curved surface 5a and the reflective curved surface 5b are determined.

The photodetection element 6 detects illuminance of the light received by the light receiving surface 6a. The microcomputer 7 (FIG. 3) determines light and dark around the vehicle, based on this detection result of the photodetection element 6, and outputs a lighting command or a lighting-out command of the headlights and the tail lights to the vehicle control device through the communication circuit 8 (FIG. 3). The vehicle control device turns on the headlights and the tail lights when receiving the lighting command from the photodetection device 100, and the device turns off the headlights and the tail lights when receiving the lighting-out command from the photodetection device 100.

Moreover, the microcomputer 7 controls the air conditioner, based on the illuminance of the light and illuminance of infrared ray contained in the light, which are detected by the photodetection element 6, to adjust a temperature in the vehicle interior. In one or more embodiments, the photodetection element 6 is shared for the lighting control of the headlights and the tail lights and for control of the air conditioner in the vehicle.

According to one or more of the above-described embodiments, the annular incident curved surface 5a and the reflective curved surface 5b opposed to the same are provided around the central axis Q of the light guiding member 5. Thus, the ambient light (FIGS. 8C-A and 8C-B) entering the photodetection device 100 at the predetermined inclination angle $\theta_3$ from all the directions, which affects the lighting/lighting-out control of the lamps of the vehicle, can be guided by the light guiding member 5 to be detected by the one photodetection element 6. Moreover, the ambient light (FIGS. 8A, 8B, 8D) entering the photodetection device 100 at the inclination angles $\theta_1$, $\theta_2$, $\theta_4$, which hardly affects the lighting/lighting-out control of the lamps of the vehicle, or the ambient light entering from immediately above can be prevented from being received by the light receiving surface 6a of the photodetection element 6. Accordingly, of the incident ambient light, only the light that needs to be detected can be efficiently guided to the photodetection element 6.

As a result, since a number of photodetection elements 6 need not be provided below the lens 1a and the light guiding member 5, the photodetection device 100 is not increased in size in a width direction perpendicular to the central axis Q, so that the downsizing of the photodetection device 100 can be realized.

Moreover, since the reflective curved surface 5b of the light guiding member 5 is provided inside the incident curved surface 5a, the light guiding member 5 can be restrained from increasing in size in a radial direction perpendicular to the central axis Q, so that the downsizing of the photodetection device 100 can be realized.

Moreover, since the substrate 2 where the photodetection element 6, the microcomputer 7, the communication circuit 8 and the like are provided is arranged in parallel to the central axis Q, further downsizing in the width direction of the photodetection device 100 can be realized.

Moreover, this allows the light receiving surface 6a of the photodetection element 6 to be arranged in parallel to the central axis Q, so that the light receiving surface 6a and the lens 1a are not opposed to each other. Thus, after the ambient light entering at the predetermined inclination angle $\theta_3$ from all the directions is caused to enter from the incident curved surface 5a of the light guiding member 5, the ambient light is sequentially reflected at the reflective curved surface 5b and the reflective surface 5c to be guided to the light receiving surface 6a of the photodetection element 6, which enables the ambient light to be surely detected by the photodetection element 6.

The illuminance of the ambient light entering at the predetermined inclination angle $\theta_3$ from all the directions, which affects the lighting/lighting-out control of the lamps of the vehicle is detected by the photodetection element 6, and the lighting/lighting-out of the headlights and the tail lights of the vehicle can be accurately controlled, based on the detection result.

Figure 9:
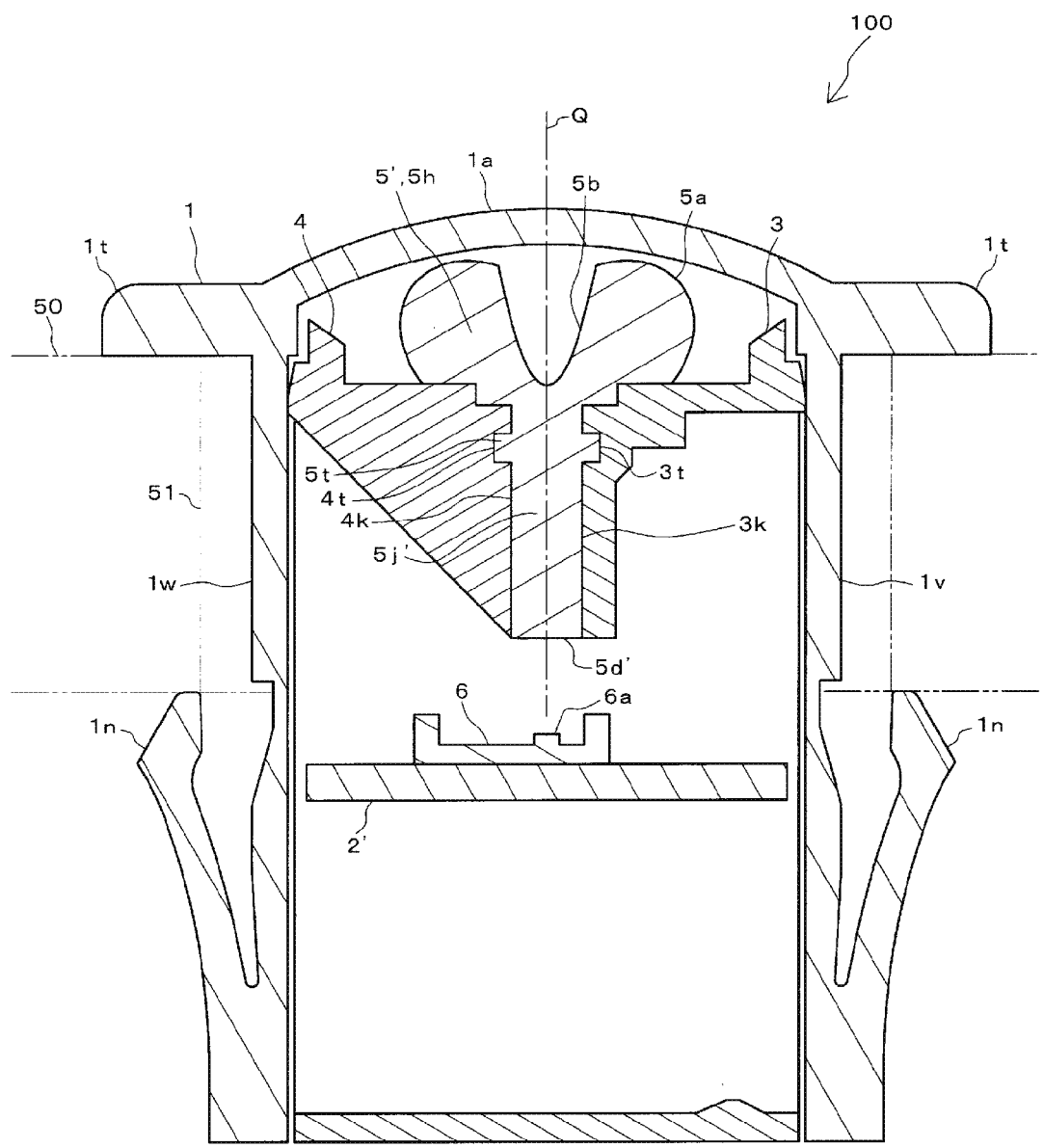
FIG. 9 is a cross-sectional view of a photodetection device according to one or more embodiments of the present invention.

Various embodiments other than the above-described embodiments can be employed. For example, while in one or more of the above-described embodiments, the example in which the substrate 2 on which the photodetection element 6 is mounted is arranged in the vertical direction parallel to the central axis Q is described, the present invention is not limited thereto. Otherwise, for example, as shown in FIG. 9, a substrate 2' and the light receiving surface 6a of the photodetection element 6 mounted on the substrate 2' may be arranged perpendicularly to the central axis Q. In this case, an outgoing surface 5d' only needs to be provided at a lower end of a shaft part 5j' of a light guiding member 5', and the reflective surface 5c shown in FIG. 3 and the like can be omitted. Moreover, the light receiving surface 6a of the photodetection element 6 only needs to be provided so as to be opposed to the outgoing surface 5d'.

Figure 10A:
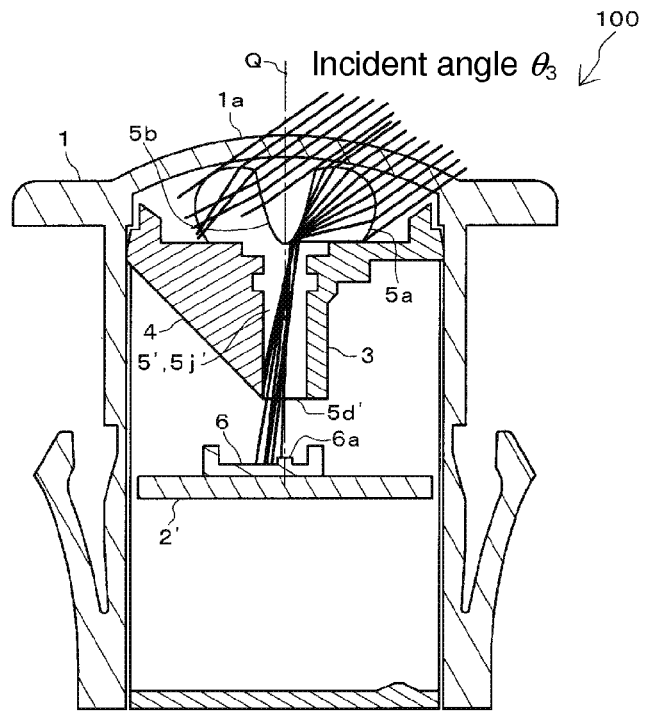
FIGS. 10A-10B are cross-sectional views showing shining states of ambient light to the photodetection device in FIG. 9.
Figure 10B:
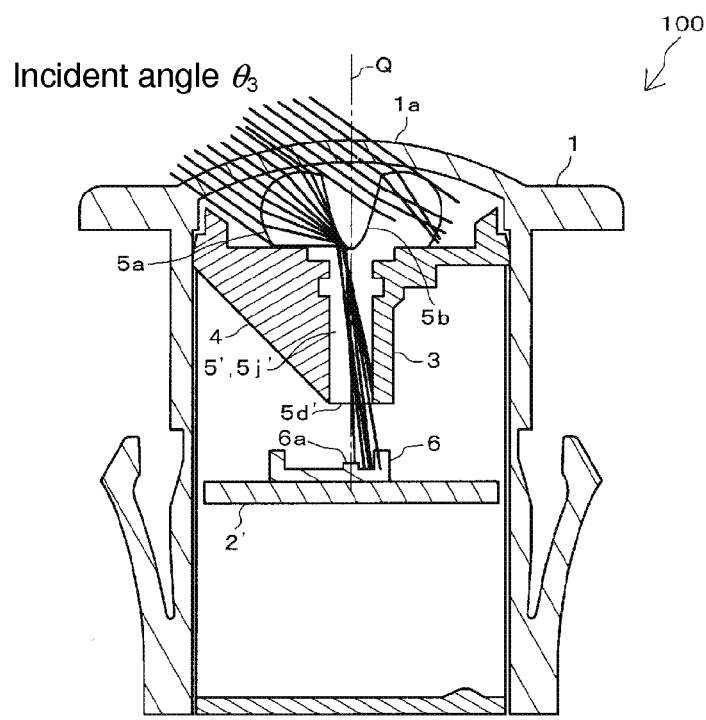

Thereby, the light passing through the lens 1a at the predetermined inclination angle $\theta_3$ from all the directions and entering the incident curved surface 5a of the light guiding member 5 is reflected at the reflected curved surface 5b after being bent at the incident curved surface 5a, for example, as indicated by bold lines in FIGS. 10A and 10B. The light advances downward through the shaft part 5j', and is emitted from the outgoing surface 5d' to be received by the light receiving surface 6a of the photodetection element 6.

Moreover, while in one or more of the above-described embodiments, the example in which the upward convex lens 1a is provided in the upper portion of the housing 1 as the light passing part is described, the present invention is not limited thereto. In place of this, for example, a downward convex lens, a concave lens, or an optical element that passes light other than a lens, and so on may be provided as the light passing part. Moreover, the light passing part may be an even plate part. Furthermore, a simple hole, opening or the like may be provided as the light passing part.

Figure 11A:
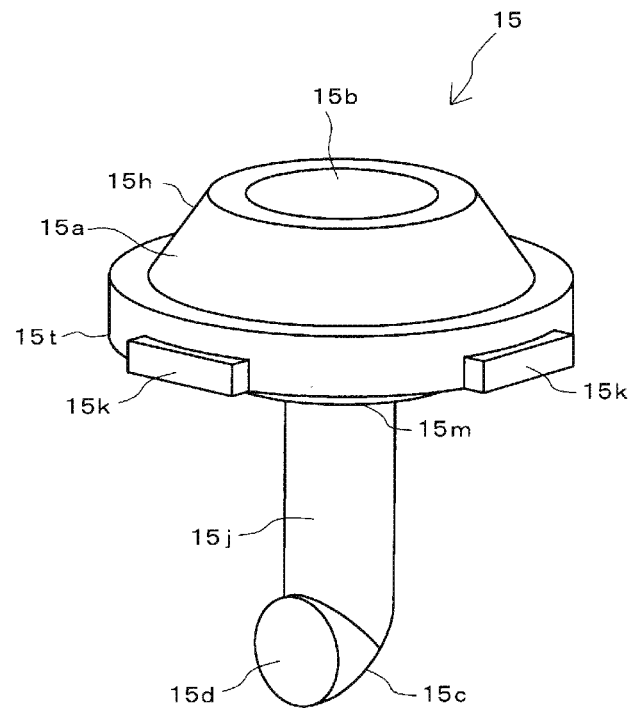
FIGS. 11A and 11B are a perspective view and a cross-sectional view showing a light guiding member according to one or more embodiments of the present invention.
Figure 11B:
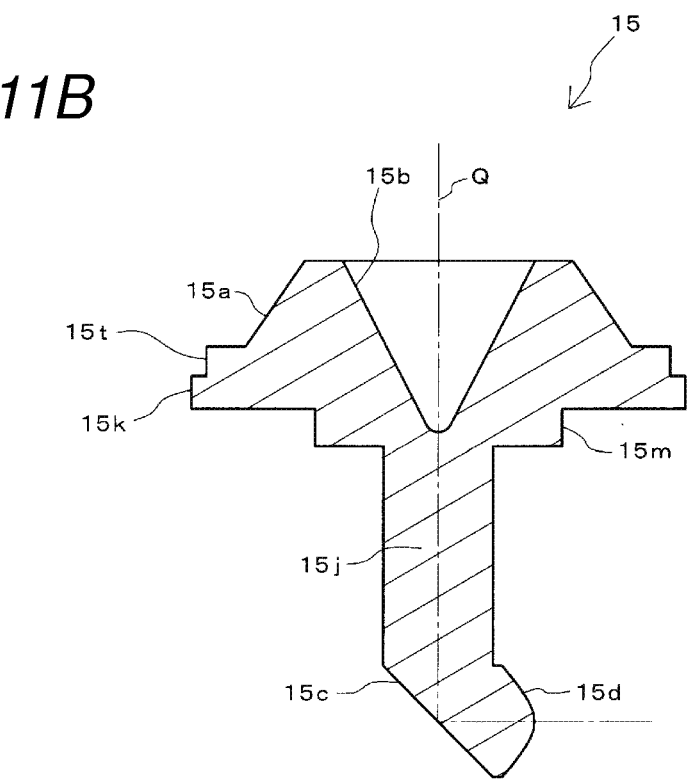

Moreover, while in one or more of the above-described embodiments, the light guiding member 5 including the head part 5h formed into a substantial toroidal shape is exemplified, in place of this, a light guiding member 15 having a shape as shown in FIGS. 11A and 11B may be used. The light guiding member 15 has a shaft part 15j extending in the direction of the central axis Q, an annular head part 15h provided above this shaft part 15j so as to surround the central axis Q, a disk-shaped flange part 15t integrally provided under this head part 15h, and a small-diameter part 15m integrally provided under this flange part 15t. In an outer circumference of the flange part 15t, four projections 15k (only two are illustrated in FIGS. 11A and 11B) are formed at an interval of 90° in a circumferential direction.

The head part 15h is formed into a circular truncated cone, which is recessed in a center of an upper surface, and has a larger outer diameter than the shaft part 15j. An incident curved surface 15a is formed on an outer side of the head part 15h. A funnel-shaped reflective curved surface 15b is formed on an inner side of the head part 15h. Thereby, the incident curved surface 15a is provided annularly around the central axis Q, and the reflective curved surface 15b is provided around the central axis Q inside the incident curved surface 15a so as to be opposed to the incident curved surface 15a.

Figure 12:
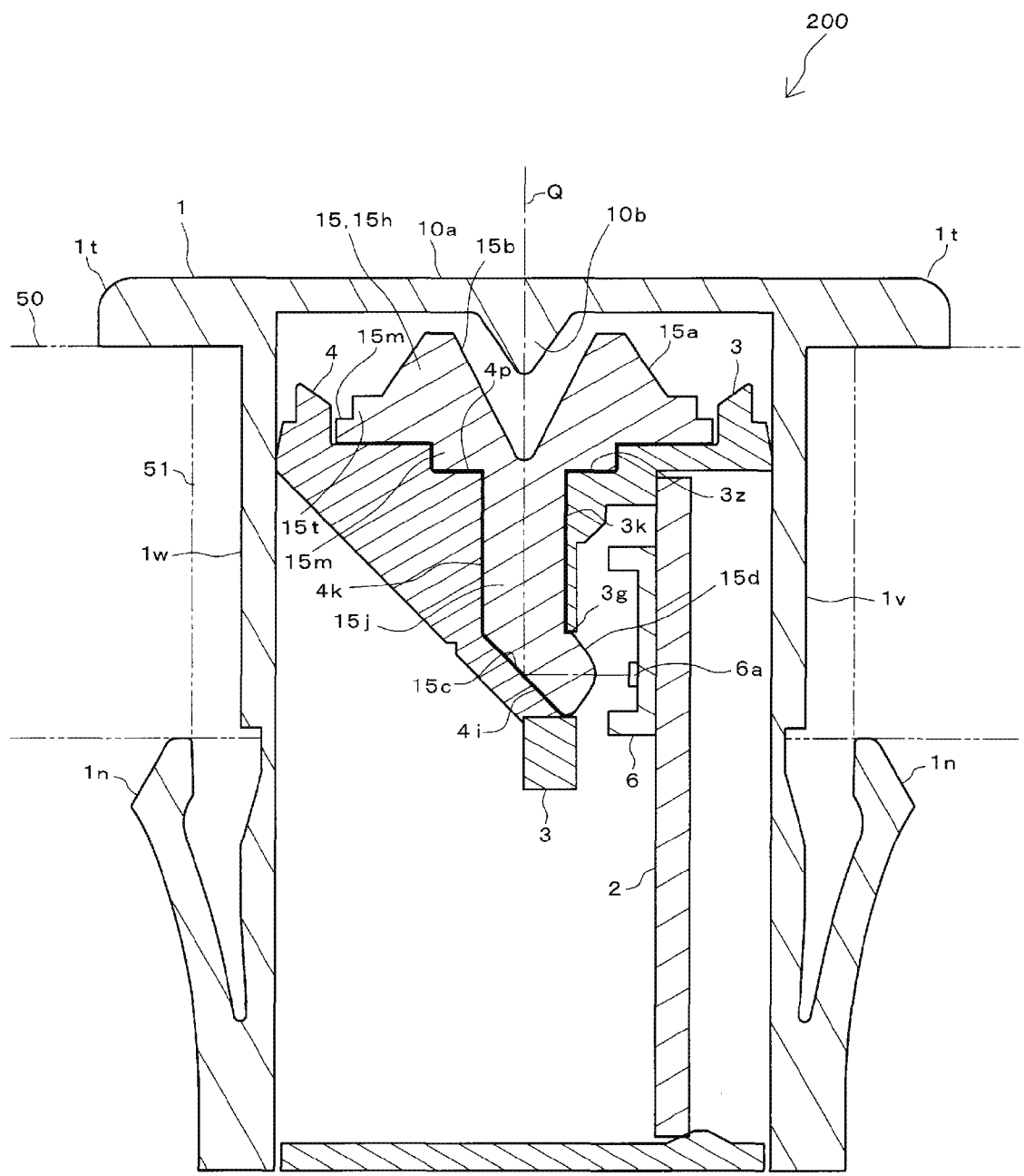
FIG. 12 is a cross-sectional view of a photodetection device including the light guiding member in FIGS. 11A and 11B.

Particularly, as shown in FIGS. 12 and 11B, when the light guiding member 15 is cut along a plane including the central axis Q, the incident curved surface 15a of the annular head part 15h has a shape including a linear portion in the cutting plane. While in this case, the whole portion is the linear portion, a curved portion may be partially included (in an end portion or the like). Moreover, when the light guiding member 15 is cut along the plane including the central axis Q, the reflective curved surface 15b of the annular head part 15h has a shape including a linear portion in the cutting plane. While in this case, a curved portion exists beside the linear portion, the whole portion may be the linear portion or the curved portion.

The shaft part 15j is formed into a columnar shape, and has a lower end portion bent at a right angle toward one side direction. On an outer side of the bent portion of this shaft part 15j, a reflective surface 15c is provided so as to be inclined at a predetermined angle with respect to the central axis Q. Moreover, at a forefront of the shaft part 15j, an outgoing surface 15d directed to the one side direction is provided. As can be seen from FIG. 11B, the outgoing surface 15d is formed into a convex lens. Thereby, the light emitted from the outgoing surface 15d becomes light condensed at the convex lens to efficiently enter the light receiving surface 6a of the photodetection element 6 shown in FIG. 12.

Figure 13:
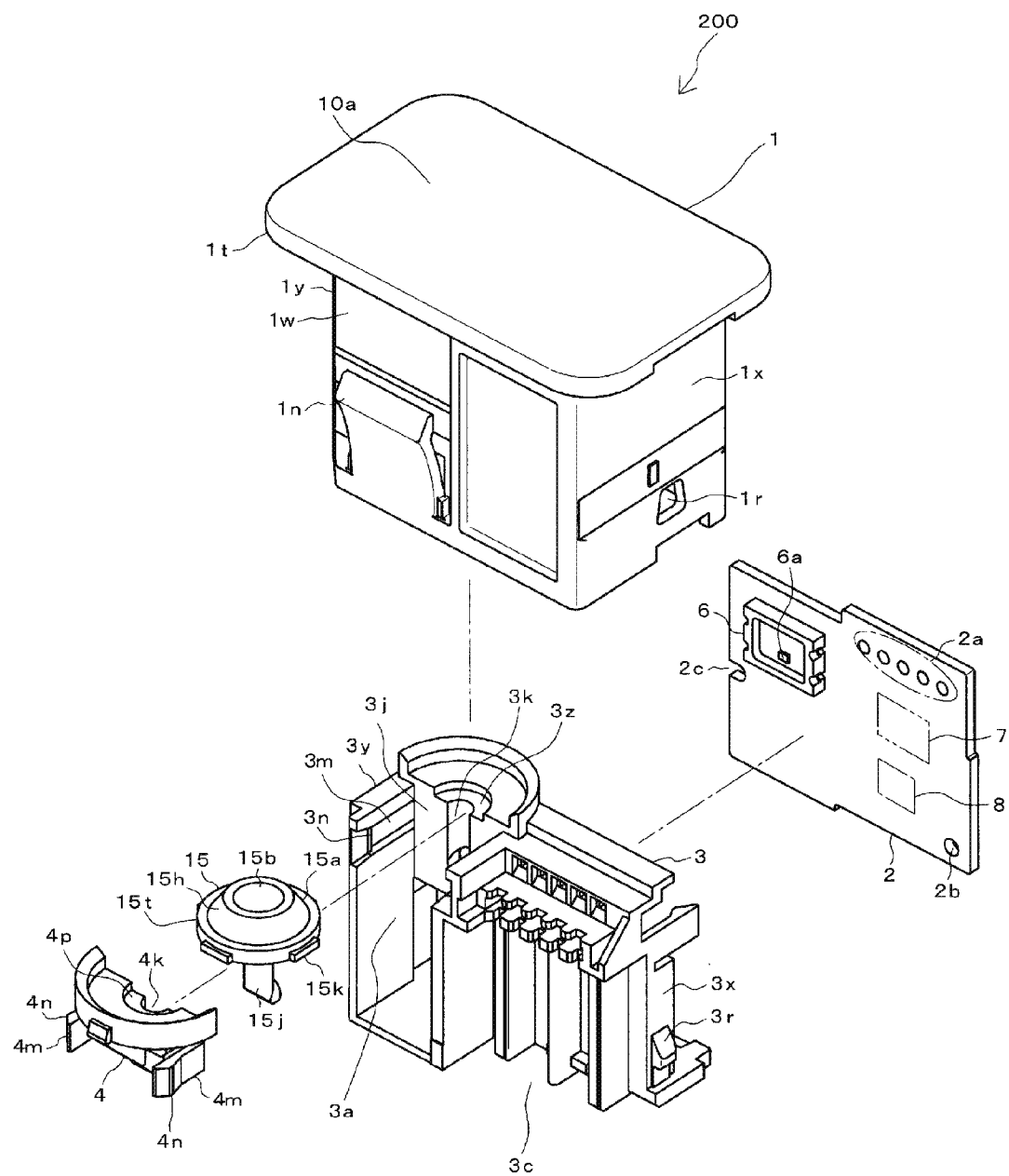
FIG. 13 is an exploded view of the photodetection device in FIG. 12.

FIG. 12 is a cross-sectional view of a photodetection device 200 including the above-described light guiding member 15, and FIG. 13 is an exploded view. As shown in FIG. 12, an upper surface of the housing 1 is a light passing part 10a made of an even plate part. In a portion of an inner surface of this light passing part 10a opposed to the reflective curved surface 15b, a projected part 10b projected on a light guiding member 15 side is provided. The light passing part 10a transmits, for example, an infrared component and a visible light component of incident light. In this case, the existence of the projected part 10b limits the incident light that passes through the light passing part 10a and reaches the light guiding member 15, especially in light entering from immediately above, for example, to about 50%. This can restrain the light entering from the immediately above from passing the shaft part 15j and entering the photodetection element 6. As a result, output of the photodetection element 6 by the incident light at angles other than predetermined inclination angle can be reduced.

The light guiding member 15 is sandwiched by the holding member 3 and the attachment member 4 in a state where the small-diameter part 15m is contained in depressed parts 3z, 4p (refer to FIG. 13 as well) formed in the holding member 3 and the attachment member 4, respectively. At this time, the projections 15k on the outer circumference of the flange part 15t restrict rotation around the central axis Q of the light guiding member 15. Since other configurations are basically the same as those in FIGS. 2 and 3, descriptions thereof are omitted.

Figure 14A:
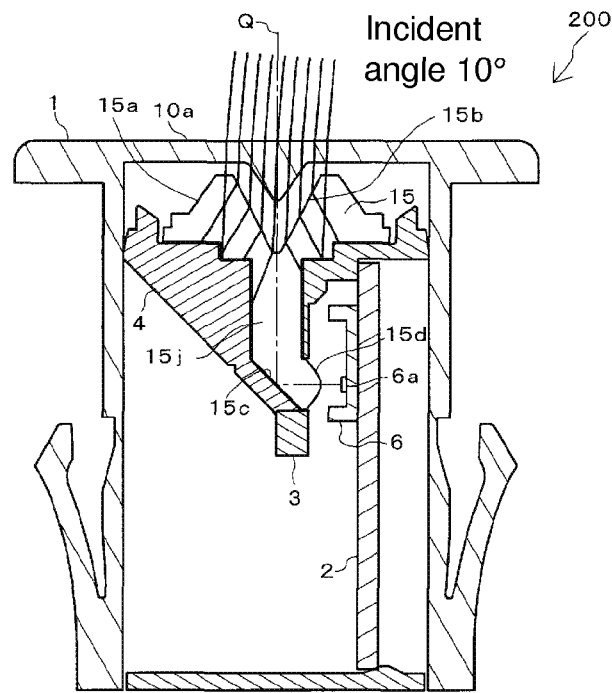
FIG. 14A is a cross-sectional view showing a shining state of ambient light to the photodetection device in FIG. 12.
Figure 14B:
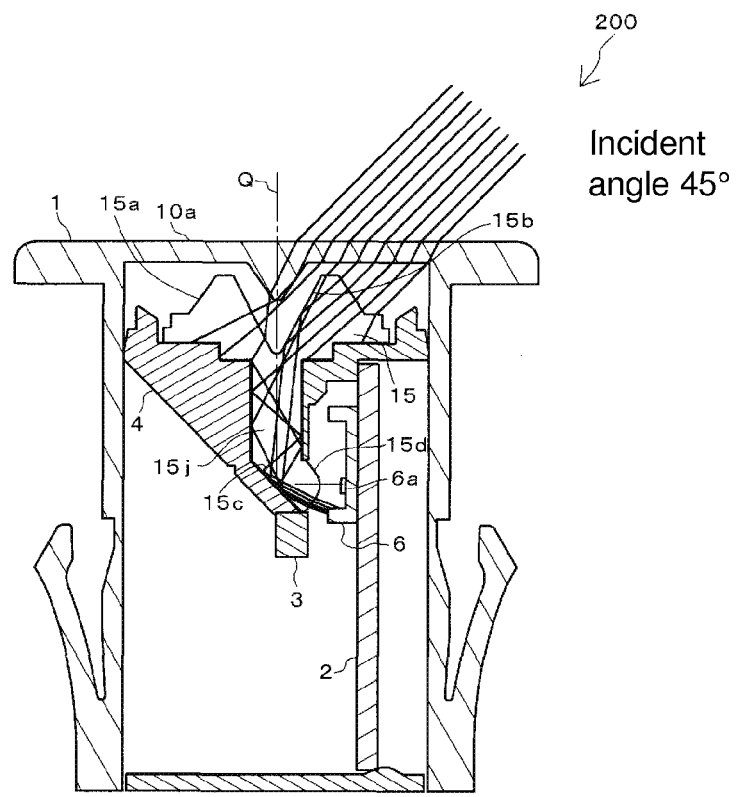
FIG. 14B is a cross-sectional view showing a shining state of ambient light to the photodetection device in FIG. 12.
Figure 14D:
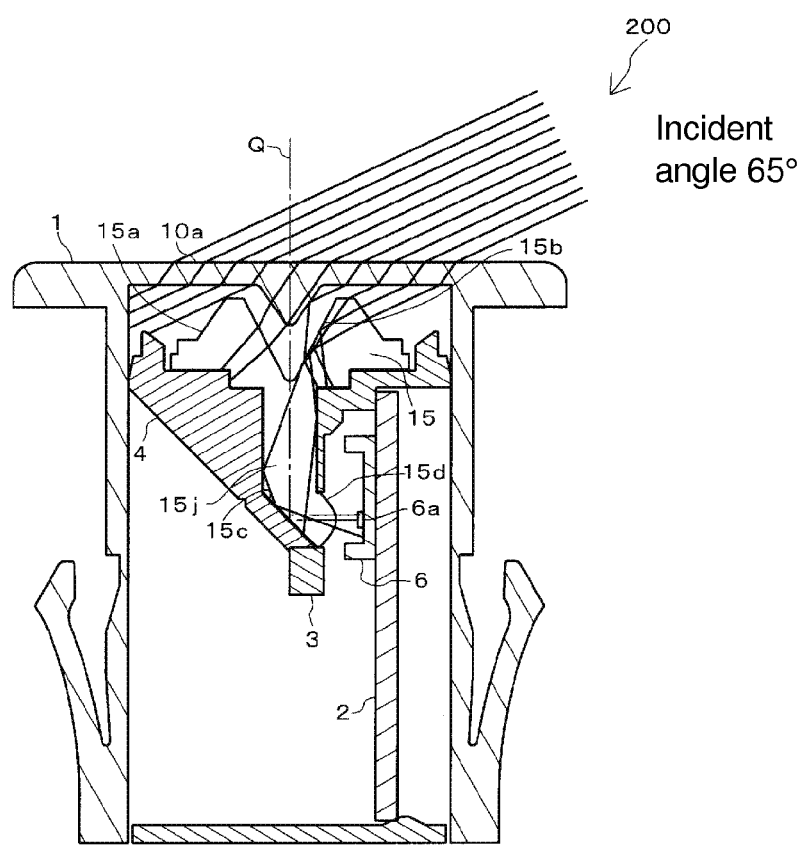
FIG. 14D is a cross-sectional view showing a shining state of ambient light to the photodetection device in FIG. 12.

FIGS. 14A to 14D are cross-sectional views showing shining states of ambient light to the photodetection device 200. Here, cases where as to the incident angles $\theta_1$ to $\theta_4$ in FIG. 8A to 8D, $\theta_1=10°$, $\theta_2=45°$, $\theta_3=55°$, and $\theta_4=65°$ are exemplified. In the cases of FIGS. 14A, 14B, 14D, the light entering the light passing part 10a advances in optical paths indicated by bold lines, so that it is not received at the light receiving surface 6a of the photodetection element 6. On the other hand, in each of the cases of FIGS. 14C-A and 14C-B, the light entering the light passing part 10a advances in an optical path indicated by bold lines, and is received at the light receiving surface 6a of the photodetection element 6. Accordingly, only the ambient light entering at the incident angle 55° from all the directions can be guided to the light receiving surface 6a of the photodetection element 6 by the light guiding member 15.

Particularly, the ambient light entering the incident curved surface 15a at the incident angle 55° is refracted in accordance with a relative refractive index between the light guiding member 15 and air. The refracted light reaches the reflective curved surface 15b and is reflected at the same angle as the incident angle to the reflective curved surface 15b. This reflected light passes the shaft part 15j and reaches the reflective surface 15c, and is reflected at the reflective surface 15c to enter the light receiving surface 6a of the photodetection element 6. In this manner, the photodetection device 200 can detect the light in the vicinity of the desired incident angle (in the above-described example, 55°) from the incident ambient light.

The formation of the outgoing surface 15d into a convex lens as shown in FIG. 11B and the provision of the projected part 10b in the inner surface of the light passing part 10a as shown in FIG. 12 can also be employed in one or more of the embodiments in FIGS. 1A to 10.

Moreover, as shown in FIG. 9, the configuration can also be employed in one or more of the embodiments in FIGS. 11A to 13, in which the outgoing surface 5d' is provided at the lower end of the shaft part 5f' of the light guiding member 5', and the substrate 2' and the photodetection element 6 are arranged as illustrated.

Furthermore, while in one or more of the above-described embodiments, the examples in which one or more embodiments of the present invention is applied to the photodetection devices 100, 200 for automatically controlling the lighting/lighting-out of the headlights and the tail lights of the automatic four-wheeled vehicle are described, one or more embodiments of the present invention can also be applied to a photodetection device for controlling other lamps, air conditioners and the like.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A photodetection device comprising:
a light passing part in an upper portion;
a light guiding member; and
a photodetection element in a lower portion,
wherein light passing through the light passing part is guided by the light guiding member to be detected by the photodetection element,
wherein the light guiding member comprises:
an incident curved surface provided annularly around a central axis on a side of the light passing part, and
a reflective curved surface provided around the central axis inside the incident curved surface so as to be opposed to the incident curved surface,
wherein the light guiding member reflects light at the reflective curved surface to guide the light to a light receiving surface of the photodetection element, the light passing through the light passing part and entering the incident curved surface at a predetermined inclination angle,
wherein the light guiding member comprises:
a shaft part extending in a direction of the central axis, and
an annular head part provided above the shaft part so as to surround the central axis,
wherein the incident curved surface is formed on an outer side of the head part,
wherein the reflective curved surface is formed on an inner side of the head part, and
wherein an outgoing surface that emits the light to the photodetection element is formed at a forefront of the shaft part.

2. The photodetection device according to claim 1, wherein the incident curved surface of the annular head part has a shape including a curved portion projected outward in a cutting plane when the light guiding member is cut along the plane including the central axis.

3. The photodetection device according to claim 1, wherein the incident curved surface of the annular head part has a shape including a linear portion in a cutting plane when the light guiding member is cut along the plane including the central axis.

4. The photodetection device according to claim 1, wherein the outgoing surface is formed into a convex lens.

5. The photodetection device according to claim 1, wherein in a portion of an inner surface of the light passing part opposed to the reflective curved surface, a projected part projected on a side of the light guiding member is provided.

6. The photodetection device according to claim 1, further comprising:
a substrate on which electronic components including the photodetection element are mounted,
wherein the photodetection element has the light receiving surface that receives the light,
wherein the light receiving surface is arranged in parallel to the central axis, and
wherein the light guiding member further has a reflective surface that reflects light to the photodetection element, the light entering the incident curved surface at the predetermined inclination angle and reflected at the reflective curved surface.

7. The photodetection device according to claim 1, wherein illuminance of ambient light of a vehicle is detected by the photodetection element so that lamps of the vehicle are controlled, based on the detection result.

* * * * *